May 23, 1944. H. P. DAVIS 2,349,409
METHOD AND APPARATUS FOR THE PRODUCTION OF MAGNESIUM
Original Filed Feb. 20, 1942 2 Sheets-Sheet 1

INVENTOR.
HARRY P. DAVIS,
Deceased,
BY CLARITA DAVIS
Administratrix,

May 23, 1944. H. P. DAVIS 2,349,409
METHOD AND APPARATUS FOR THE PRODUCTION OF MAGNESIUM
Original Filed Feb. 20, 1942 2 Sheets-Sheet 2

INVENTOR.
HARRY P. DAVIS,
Deceased,
CLARITA DAVIS,
Administratrix,

Patented May 23, 1944

2,349,409

UNITED STATES PATENT OFFICE 2,349,409

METHOD AND APPARATUS FOR THE PRODUCTION OF MAGNESIUM

Harry P. Davis, deceased, late of Palo Alto, Calif., by Clarita Davis, administratrix, Palo Alto, Calif., assignor, by mesne assignments, to The Anglo California National Bank of San Francisco, San Francisco, Calif., a national banking association, as trustee for the benefit of Reconstruction Finance Corporation, San Francisco, Calif., a corporation of the United States Original application February 20, 1942, Serial No. 431,752. Divided and this application April 29, 1943, Serial No. 485,000

4 Claims. (Cl. 266—19)

This application is a division of the application Serial No. 431,752, for Methods and apparatus for the production of magnesium, filed by Harry P. Davis on February 20, 1942.

This invention relates to the production of metallic magnesium by the reduction of magnesium oxide-containing raw material, particularly of burned dolomite or magnesite, with the aid of a reducing agent such as silicon (ferrosilicon), or aluminum or a mixture of both, or of similar reducing agents which do not generate gaseous products of oxidation.

It is well known that in effecting the above reduction operation with the use of a continuously fed furnace, various difficulties are encountered, as well as in the type in which the operation is effected at a temperature above the melting point of the reaction components, as in the other type in which the mixture is heated at a temperature below its melting point. Both processes are disadvantageous. The reduction of magnesia in the liquid state is a rather slow reaction, leaving behind a considerable proportion of the unaltered magnesia; moreover disengagement of the magnesium vapor from the molten metal mass is difficult; finally there is an appreciable attack on the furnace lining by the molten slag. On the other hand reduction exclusively in the solid state, while proceeding at a more rapid rate, gives rise to difficulties in removing the spent residue; moreover, serious difficulties arise from the fact that in conducting the operation such as to obtain economical rates of vapor flow, the vapor evolved will carry over dusty impurities into the condenser, as a consequence of which there will not be recovered metal answering as to practical purity requirements.

The art has therefore resorted to intermittent processes. But operations of this kind have generally the disadvantage of being tedious. This is in particular the case with magnesium reduction since it is necessary to wait before discharging the retort, until it cools to a temperature below 80-100° C., since otherwise the magnesium would react with the atmospheric oxygen and nitrogen, which reaction may be so violent that the magnesium may be set on fire.

It is the object of the invention to reduce the time required for carrying out the whole cycle of operation to a minimum, and to enable thereby the operation to be carried out on a very large scale without the use of an excessive amount of retort units. Another object of the invention is to facilitate the removal of the spent residue from the zone of the reaction. A further object of the invention is to enable the magnesium vapor to be disengaged at a rate high enough for obtaining commercially economical rates of vapor flow, and yet to produce a solid deposit practically free from solids carried over by the vapor. Still another object of the invention, is to produce higher durability of the apparatus by allowing the exhausted residues to be more easily discharged.

Other objects and advantages will be apparent from the following specification in connection with the accompanying drawings.

Referring to the drawings.

Figure 1:
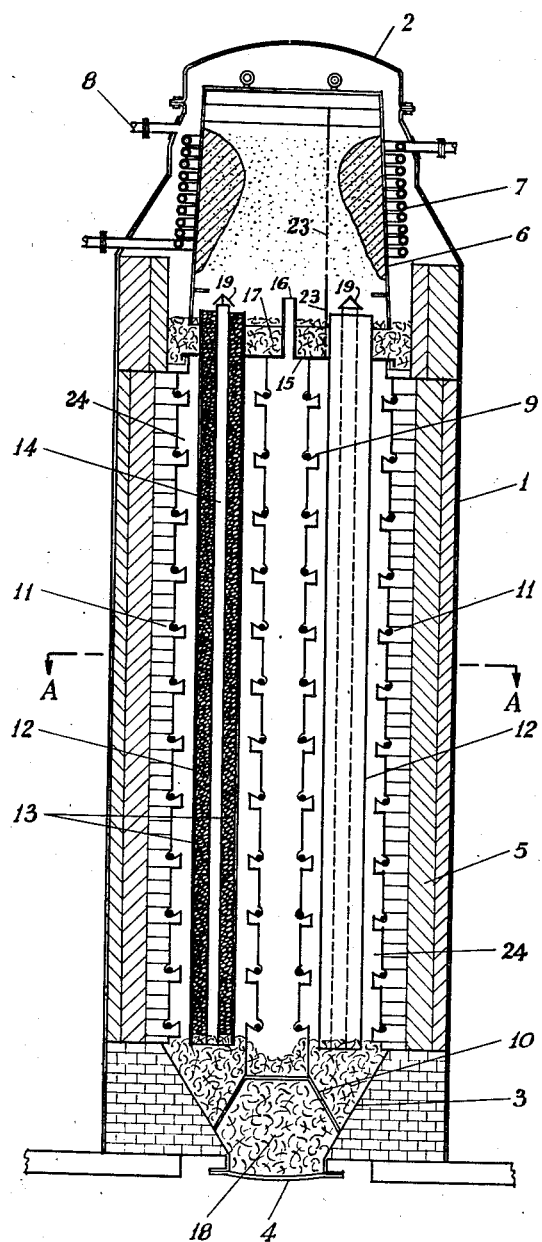
Figure 1 is a vertically longitudinal section through the apparatus embodying my invention.
Figure 2:
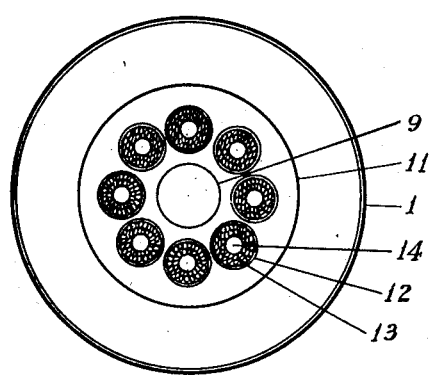
Figure 2 is a section taken on the line A—A of Figure 1.

Referring first to Figure 1, a relatively long steel cylinder 1 which has a closed bottom, and is equipped with a releasable cover 2 at the head, and a discharging device 3 with a door 4 at the bottom, forms the outer shell of the apparatus. This outer shell is insulated by a refractory lining 5 impermeable for gases. In the interior of the vertical shaft 24 enclosed, which constitutes the retort, there are electric heating means 9 and 11 disposed, whereas in the interior of the upper portion there is a condenser 6 removably situated which is provided with a cooling device 7. The condenser 6 is split vertically at 23, into halves or into three or four sections, so that it can be opened and the condensed material readily removed from its surface. Any suitable means for evacuating the whole mounting, may be connected thereto by the pipe 8.

Inside the retort there is centrally displaced a tubular electric resistance heating device 9, resting by supports 10 on the inwardly inclined wall of the discharge device 3. A larger annular electric heating device 11, is disposed on the inside of the refractory lining 5. Within the annular interspace between the outer and the inner central heating device, there are placed a plurality, for instance 8, of tubular members 12, destined for receiving the charge 13, which are provided with means 14 adapted to form a substantially unobstructed passageway for the vapor released from the charge, and centrally disposed within the charge so as to reduce, by displacement, the radial extent thereof. In the case as shown in the drawings, the said central duct member comprises a tube 14 having round about a large number of perforations from end to end, thereby permitting the charge 13 which occupies the annular space between said duct member and the inside wall of the tube, to be uniformly supplied with heat, and thus also to disengage magnesium vapor uniformly throughout the entire reacting mass. The interior of the retort is covered by a tightly fitting plate 15, welded or otherwise secured to the open upper end of the central heating device 9, and the charge container tubes 12 passed through round about the said heating device, a vent pipe 16 connecting the interior of device 9 to the evacuating means being provided thereupon and all of the joints being sealed by a sand seal 17 heaped up on the plate 15. At their open under ends the tubular heating device 9 and the charge container tubes 12 are sealed by another bottom sand seal 18. The object of both these seals is substantially to prevent the metallic vapor evolved from entering into interspaces where they are not wanted, and thus coming into contact with the heating elements and brickwork. At the upper ends the charge container tubes 12, are provided with a conical cap or cover 19 which is perforated to form a screen. After the removal of the cover 2 and lifting out the condenser 6, the charge is fed in, and is spread by the cones 19 in the open annular space between the duct member 14 and the inside wall of the tubes 12, up to a level somewhat below the plate 15. Thereupon condenser 6 is dropped down into position, cover 2 closed and vacuum applied through the connection 8 to produce residual pressure below two millimeters. Heat is now applied by means of the heating elements 9 and 11 to maintain the charge at a temperature causing active vaporization below the melting point of magnesium. The vapor disengaged escapes through the lateral openings of the central duct members 14, of the charge container tubes 12, and rises in the condenser 6, where it condenses as a thick annular deposit of crystalline character, adhering to the inner surface. There follow the steps of completely cooling down, sweeping out by a gas indifferent to magnesium (which is introduced and withdrawn by suitably positioned pipes not shown in the drawings), opening cover 2, and lifting out the condenser 6 for recovering the sublimate. The bottom cover 4 can now be opened to discharge the bottom sand seal, and thereupon also the spent residues by gravity. Finally the bottom opening is closed by cover 4, and the bottom sand seal rearranged in its proper place by filling, through the annular space between the duct member 14 and the inside wall of the tubes 12, the material used for the purpose. The apparatus is now ready for being charged again with the mixture of magnesium oxide-containing material, and reducing agent under treatment. After reintroducing the condenser, closing the cover 2 and reducing the pressure to the extent required, the described cycle of operation is set going again.

Figure 5:
Figure 5 is a view of details in connection with the briquettes to be fed into the apparatus.
Figure 3:
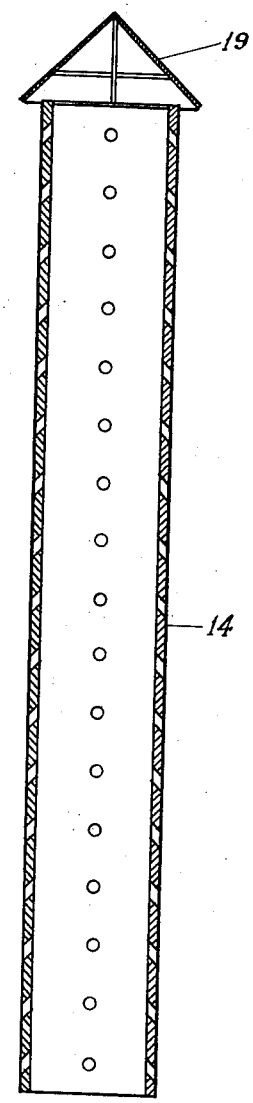
Figure 3 is a fragmentary section taken on an enlarged scale, showing details of the apparatus.

The charge may consist of pellets, tablets or briquets, for instance of (Figure 5) ovoid shape, which are preferably preheated in the compacted state, to a temperature of 700-900° C., to free them substantially completely from carbon dioxide, and to save time and energy in the operation of the electric retort furnace.

Materials preferably used for arranging the sand seals are magnesium oxide, or spent residues of the operation, both in very fine subdivision.

Figure 4:
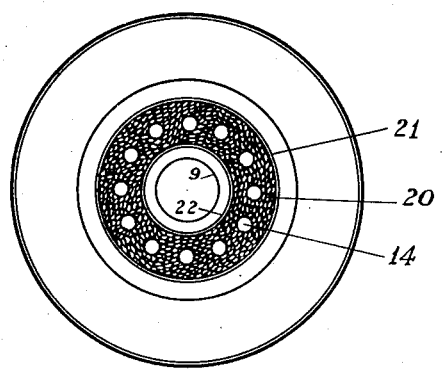
Figure 4 is a horizontal section showing an alternative embodiment of the apparatus.

In Figure 4 there is another embodiment of the invention described, in which the charge container tubes 12 are replaced by an annular interspace 20, between an outer ring 21 and an inner ring 22, which interspace is intended to receive the charge. The duct members 14 are disposed, at regular intervals, in the charge itself. The operation of this form of the device is apparent from the foregoing description.

For effecting reduction with the aid of ferro-silicon, for instance 100 parts by weight of burned dolomite, may be mixed up with 13.8 parts by weight of ferrosilicon. With a vacuum of about 0.1 millimeter reduction takes place at about 1150° C.

What is claimed is:

1. An apparatus for the production of metallic magnesium by reducing magnesium oxide-containing material with the aid of reducing agents capable of exclusively furnishing solid reduction products, comprising in combination a longitudinally extended receptacle of substantially tubular shape, closed at the bottom of the lower portion adapted to be heated to serve as a retort and provided with a removable cover at the top of the upper portion adapted to be kept cool to serve as a condenser, and a plurality of vapor-conducting means uniformly being embedded in the surrounding charge and adapted to establish proper communication between the interior of the charge and the common condenser.

2. An apparatus for the production of metallic magnesium by reducing magnesium oxide-containing material with the aid of reducing agents capable of exclusively furnishing solid reduction products, comprising in combination a longitudinally extended receptacle of substantially tubular shape, closed at the bottom of the lower portion adapted to be heated to serve as a retort and provided with a removable cover at the top of the upper portion adapted to be kept cool to serve as a condenser, a removable condenser liner positioned in the upper portion, sealing means for preventing the passage of vapor from the heated portion to enter into the interspace between the condenser liner and the receptacle wall, a plurality of vapor-conducting means being uniformly embedded in the surrounding charge and capable of causing the vapor to escape through a plurality of relatively small passageways into the common condenser.

3. An apparatus for the production of metallic magnesium by reducing magnesium oxide-containing material with the aid of reducing agents capable of exclusively furnishing solid reduction products, comprising in combination a longitudinally extended receptacle of substantially tubular shape, closed at the bottom of the lower portion adapted to be heated to serve as a retort and provided with a removable cover at the top of the upper portion adapted to be kept cool to serve as a condenser, a removable condenser liner of the split type positioned in the upper portion, sealing means for preventing the passage of vapor from the heated portion to enter into the interspace between the condenser liner and the receptacle wall, a plurality of vapor-conducting means uniformly being embedded in the surrounding charge and capable of causing the vapor to escape through a plurality of relatively small passageways into the common condenser.

4. In an apparatus as defined in claim 1 a bottom sand seal and means for discharging the sealing material, and thereby also discharging the spent residue by gravity.

CLARITA DAVIS,
*Administratrix of the Estate of Harry P. Davis, Deceased.*